United States Patent [19]

Bailey

[11] Patent Number: 5,566,916
[45] Date of Patent: Oct. 22, 1996

[54] ADJUSTABLE PIPE BRACE

[76] Inventor: Michael E. Bailey, 1846 Rosemeade, #250, Carrollton, Tex. 75007

[21] Appl. No.: 452,354

[22] Filed: May 26, 1995

[51] Int. Cl.$^6$ ............................................. F16L 3/22
[52] U.S. Cl. ............... 248/230.1; 248/74.4; 248/229.2; 248/219.4; 248/218.4; 248/539; 24/277
[58] Field of Search ........................ 248/74.1, 74.4, 248/230.1, 229.2, 229.1, 291.1, 219.4, 218.4, 539; 24/277

[56] References Cited

U.S. PATENT DOCUMENTS

| 3,199,815 | 8/1965 | Martinkovic et al. | 24/277 |
|---|---|---|---|
| 3,347,572 | 10/1967 | Pfaff, Jr. et al. | 248/230.1 X |
| 3,605,214 | 9/1971 | Spotts et al. | 24/277 |
| 3,729,782 | 5/1973 | Downing | 24/277 |
| 4,015,313 | 4/1977 | Oldford | 24/277 |
| 4,079,487 | 3/1978 | Coop, Sr. | 24/277 |
| 4,181,284 | 1/1980 | Seppelfrick | 248/514 |
| 4,209,155 | 6/1980 | Florian | 248/74.4 X |
| 4,265,005 | 5/1981 | Heckethorn | 24/277 |
| 4,393,559 | 7/1983 | Heckethorn et al. | 24/277 |
| 4,407,050 | 10/1983 | Offterdinger | 24/277 |
| 4,500,064 | 2/1985 | Calabro | 248/539 |
| 4,755,830 | 7/1988 | Plunk | 343/890 |
| 4,993,670 | 2/1991 | Tesar | 248/68.1 |
| 4,998,691 | 3/1991 | Brown | 248/74.1 |
| 5,014,940 | 5/1991 | Sherman | 248/74.1 |
| 5,044,584 | 9/1991 | Lin | 248/230.1 X |
| 5,205,022 | 4/1993 | Norton | 24/277 |
| 5,215,281 | 6/1993 | Sherman | 248/74.1 |
| 5,274,888 | 1/1994 | Payne | 24/277 |

FOREIGN PATENT DOCUMENTS

| 1546840 | 11/1968 | France | 248/74.4 |
|---|---|---|---|
| 405213185 | 8/1993 | Japan | 248/74.1 |

Primary Examiner—Carl D. Friedman
Assistant Examiner—Yvonne Horton-Richardson
Attorney, Agent, or Firm—H. Dennis Kelly; Timmons & Kelly

[57] ABSTRACT

A U-bolt is placed around a pipe and bolted to a clamp bracket, and the clamp bracket is bolted to a support plate. A pair of spade bolts are attached to the support plate and a hinge is connected between the ends of the spade bolts. A pair of screw connect the hinge to a support surface. The clamp bracket can be pivoted relative to the support plate, and the hinge can be pivoted relative to the support plate, to allow the pipe to be secured to a support surface at any angle.

19 Claims, 2 Drawing Sheets

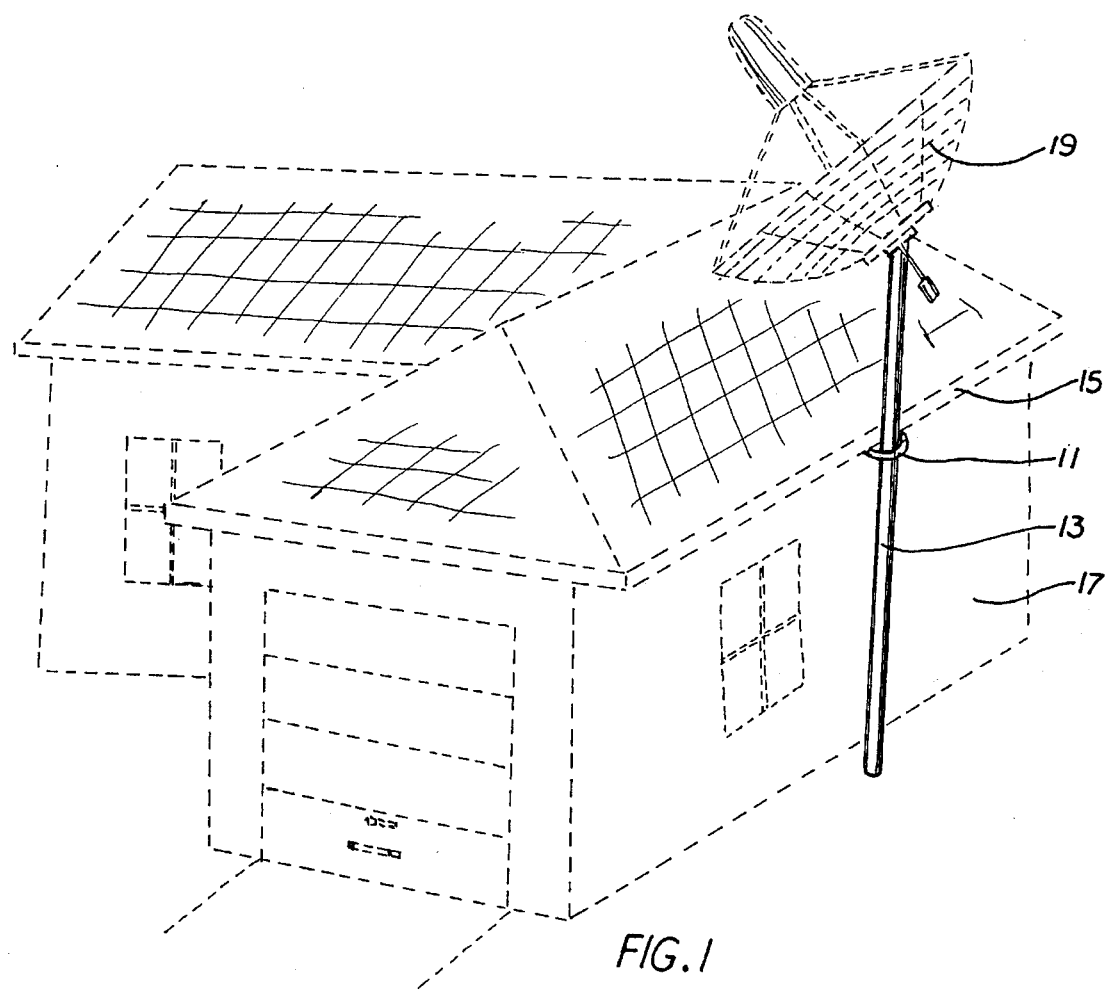
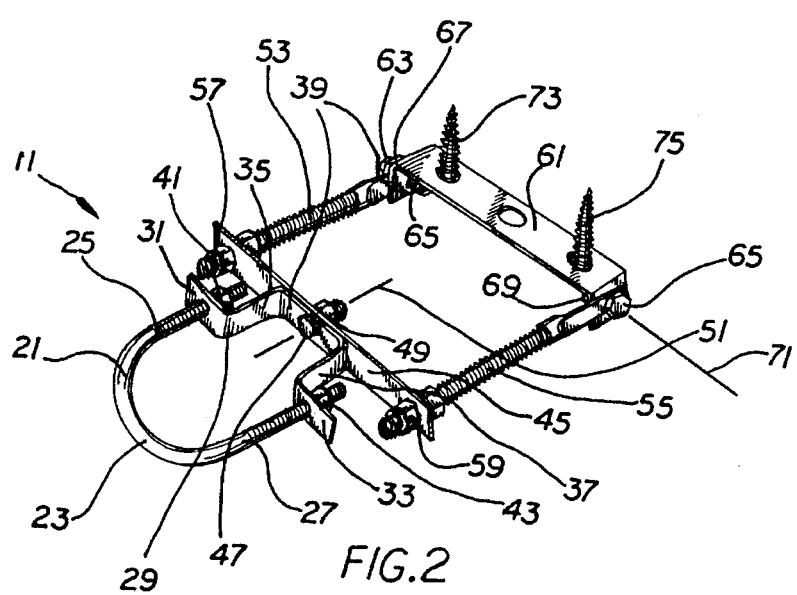

ADJUSTABLE PIPE BRACE

BACKGROUND OF THE INVENTION

1. Field of the Invention

This invention relates in general to braces for supporting a pipe or a pole against a support surface. In particular, the invention relates to adjustable pipe braces for bracing an antenna pole against the eave or the side of a house.

2. Description of Related Art

For many years television antennas were mounted on the tops poles. The poles might be mounted on top of a house, or inserted into the ground near the house. If the pole was inserted into the ground, the pole might be braced against the eave or the side of the house to stabilize the pole.

With the advent of cable television, antenna poles became less unmerous. However, the subsequent invention of satellite television caused a revival of antenna poles and the attendant technology. In fact, since satellite antennas are more directional than television antennas, it became even more important to properly brace the pole, to keep the antenna from moving in the wind.

An adjustable brace was required, because the installer never knew whether the pole would be braced against the house or against an eave. Further, different eaves have different slopes. U.S. Pat. No. 4,755,830, issued Jul. 5, 1988, to Plunk, discloses an adjustable pipe brace for securing a pole to a support surface. The assembly includes a circular ring, attached to a base bracket. The base bracket can be attached to the support surface, and the ring can be pivoted to match the axis of the pole.

SUMMARY OF THE INVENTION

The general object of the pipe brace of the invention is to secure a pipe or a pole to a support surface. In general, this object is accomplished by a U-bolt, a clamp bracket, a pair of nuts for securing the U-bolt to the wings of the clamp bracket, a support plate, a nut and a bolt for bolting the base of the clamp bracket to the support plate, and a pair of screws for connecting the support plate to a support surface. The U-bolt can be pivoted relative to the clamp bracket to allow attachment to a support surface that is not horizontal.

The above, as well as additional objects, features, and advantages of the invention will become apparent in the following detailed description.

BRIEF DESCRIPTION OF THE DRAWINGS

FIG. 1 is a perspective view of an adjustable pipe brace according to the invention, in use to secure a pole to a house.

FIG. 2 is a close-up perspective of an adjustable pipe brace according to the invention.

DESCRIPTION OF THE PREFERRED EMBODIMENT

Figure 3:
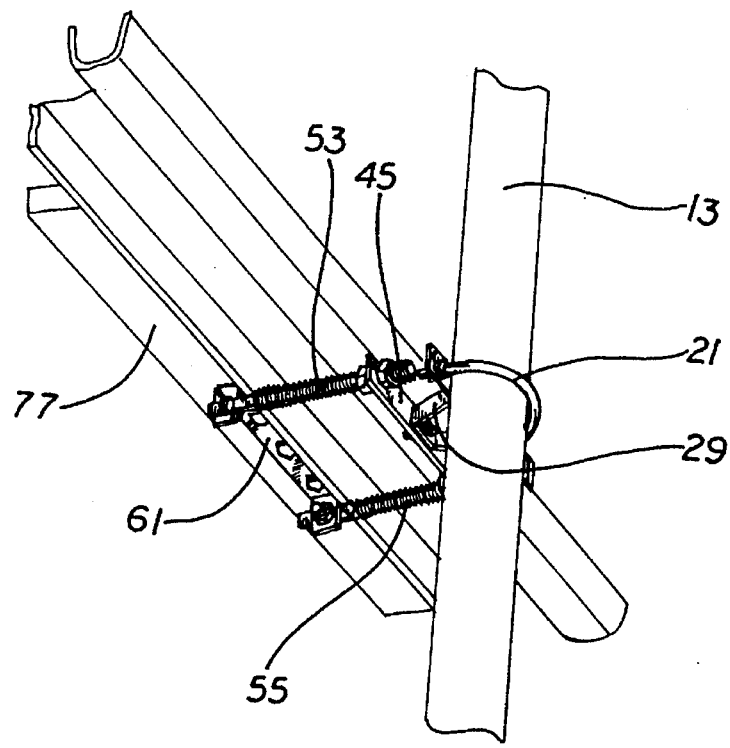
FIG. 3 is a perspective view of an adjustable pipe brace in to secure a pole to a house.

As illustrated in FIG. 1, the purpose of the pipe brace 11 of the invention is to support a pole 13 against a support surface, such as an eave 15 of a house 17. The lower end of the pole 13 may be inserted into the ground, and the upper end may support a satellite antenna 19. Part of the way up the pole 13, the pipe brace 11 secures the pole 13 against the eave 15 of the house 17. The pipe brace 11 of the invention could also be used to support other types of poles or pipes.

As shown in FIG. 2, the pipe brace 11 of the invention includes a U-bolt 21, having a bight 23 between a pair of legs 25 and 27. Each of the legs 25 and 27 has external threads, as shown.

The U-bolt 21 is attached to a clamp bracket 29. The clamp bracket 29 has a pair of wings 31 and 33, a pair of extension plates 35 and 37, and a base 39. The wings 31 and 33 are coplanar, and the legs 25 and 27 of the U-bolt 21 pass through holes in the wings 31 and 33. Nuts 41 and 43 on the threaded ends of the legs 25 and 27 secure the U-bolt 21 to the clamp bracket 29. The nuts 41 and 43 can be adjusted to hold pipe of various diameters. The holes in the wings 31 and 33 may be slotted to allow use of U-bolts 21 of various sizes.

Each of the wings 31 and 33 of the clamp bracket 29 is attached to one end of one of the extension plates 35 and 37. The other end of each extension plate 35 and 37 is attached to the base 39. The base 39 is parallel to the plane of the wings 31 and 33, and the extension plates 35 and 37 extend between the base 39 and the wings 31 and 33 at an acute angle.

The base 39 of the clamp bracket 29 is bolted to a support plate 45 with a bolt 47 and a nut 49. The bolt 47 passes through a slotted hole in the support plate 45. When the nut 49 is loosened, the clamp bracket 29 can be adjusted left or right, and can pivot about the longitudinal axis 51 of the bolt 47. The nut 49 can then be tightened to secure the clamp bracket 29 to the support plate 45 at the selected angle.

The support plate 45 is a flat, rectangular plate, and has a hole near each end. A pair of spade bolts 53 and 55 pass through the holes near the ends of the support plate 45, and are secured with nut pairs 57 and 59. The spade bolts 53 and 55 are threaded along substantially their entire length, so that the nut pairs 57 and 59 can be adjusted to virtually any point along the length of the spade bolts 57 and 59. The spade bolts 53 and 55 are parallel, and thus the distal ends of the spade bolts 53 and 55 are spaced apart.

A hinge 61 extends between the distal ends of the spade bolts 53 and 55. The hinge 61 is bolted to each spade bolt 53 and 55 with bolts 63 and 65 and nuts 67 and 69. The bolts 63 and 65 are collinear, and pass through holes in the ends of the hinge 61. When the nuts 67 and 69 are loosened, the hinge 61 can pivot about the axis of the bolts 63 and 65.

A pair of screws 73 and 75 pass through holes in the hinge 61, and attach the hinge 61 to a support surface 77, such as underside of an eave 15 of a house 17. Since the hinge 61 can be pivoted, the support surface 77 may be horizontal, vertical, or at another angle to the horizontal.

FIG. 3 illustrates the use of the pipe brace 11 of the invention. The U-bolt 21 is place around the pipe 13 and bolted to the clamp bracket 29. The clamp bracket. 29 is pivoted until the clamp bracket 29 is parallel to the surface of the support surface 7. The spade bolts 53 and 55 are adjusted to position the hinge against the support surface 77. The hinge 61 is then connected to the support surface 77. The bolt 47 and nut 49 are then tightened to secure the clamp bracket 29 and the support plate 45 together.

Figure 4:
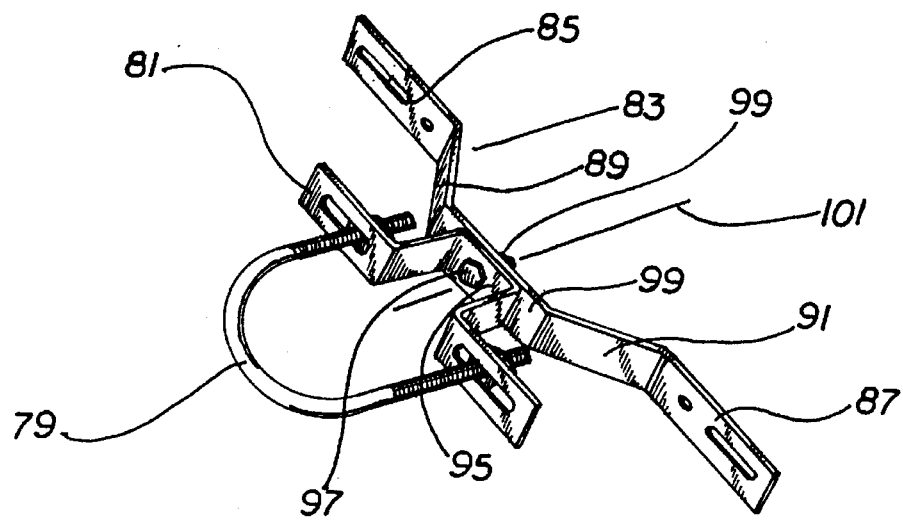
FIG. 4 is an alternate embodiment of the adjustable pipe brace the invention.

FIG. 4 illustrates an alternate embodiment of the invention. This embodiment has a U-bolt 79 and a clamp bracket 81 similar to the ones in the first embodiment. However, the clamp bracket 81 is bolted to a different type of support plate 83.

This support plate 83 has a pair of wings 85 and 87, a pair of extension plates 89 and 91 attached to the wings 85 and 87, and a base 93 attached between the extension plates 89 and 91. The wings 85 and 87 are parallel to the base 93, and the extension plates 89 and 91 extend between the wings 85 and 87 and the base 93 at an obtuse of angle of 135 degrees.

The base 95 of the clamp bracket 81 is bolted to the support plate 83 with a bolt 97 and a nut 99. The bolt 97 passes through a slotted hole in the support plate 83. When the nut 99 is loosened, the clamp bracket 81 can be adjusted left or right, and can pivot about the longitudinal axis 101 of the bolt 97. The nut 99 can then be tightened to secure the clamp bracket 81 to the support plate 83 at the selected angle.

The pipe brace of the invention has several advantages over the prior art. The pipe brace of the invention can be adjusted to the situation, whether the support surface is horizontal, vertical, or at some other angle. The pipe brace of the invention is inexpensive to manufacture, and is easy to use.

The invention has been described in only two embodiments. It should be apparent to those skilled in the art that the invention is not so limited, but is susceptible to various changes and modifications without departing from the spirit of the invention.

I claim:

1. An adjustable pipe brace for securing a pipe to a support surface, comprising:

a U-bolt having a bight between a pair of legs;

a clamp bracket, having a pair of wings, a pair of extension plates, attached to the wings, and a base attached between the extension plates;

means for securing the U-bolt to the wings of the clamp bracket to hold the pipe between the U-bolt and the clamp bracket;

a support plate;

attachment means for attaching the base to the support plate, wherein the attachment means can be loosened and retightened to allow the clamp bracket to be pivoted relative to the support plate; and connection means for connecting the support plate to the support surface.

2. An adjustable pipe brace as recited in claim 1, wherein the attachment means has a longitudinal axis, and the clamp bracket pivots about the longitudinal axis of the attachment means.

3. An adjustable pipe brace as recited in claim 2, wherein the means for securing the U-bolt to the wings can be adjusted to hold pipes of various diameters.

4. An adjustable pipe brace as recited in claim 3, wherein the support plate holds the base away from the support surface to allow the attachment means to be loosened and retightened.

5. An adjustable pipe brace, comprising:

a U-bolt having a bight between a pair of legs;

a clamp bracket, having a pair of wings, a pair of extension plates, attached to the wings, and a base attached between the extension plates;

a pair of nuts for securing the U-bolt to the wings of the clamp bracket;

a support plate;

a nut and a bolt for bolting the base to the support plate;

a pair of spade bolts attached to the support plate and having ends spaced apart from the support plate;

a hinge connected between the ends of the spade bolts; and a pair of screws for connecting the hinge to a support surface.

6. An adjustable pipe brace as recited in claim 5, wherein the hinge can be pivoted relative to the spade bolts.

7. An adjustable pipe brace as recited in claim 6, wherein the hinge is connected to the spade bolts with a pair of nuts and bolts.

8. An adjustable pipe brace as recited in claim 7, wherein the bolts connecting the hinge to the spade bolts have a longitudinal axis, and wherein the hinge pivots about the longitudinal axis of the bolts.

9. An adjustable pipe brace as recited in claim 8, wherein the spade bolts are attached to the support plate with adjustable nuts, so that the distance between the support plate and the hinge can be adjusted.

10. An adjustable pipe brace as recited in claim 9, wherein the nut and bolt that bolt the clamp bracket to the support plate can be loosened and retightened to allow the clamp bracket to be pivoted relative to the support plate.

11. An adjustable pipe brace as recited in claim 10, wherein the bolt that bolts the clamp bracket to the support plate has a longitudinal axis, and the clamp bracket pivots about the longitudinal axis of the bolt.

12. An adjustable pipe brace as recited in claim 11, wherein the nuts for securing the U-bolt to the wings can be adjusted to hold pipe of various diameters.

13. An adjustable pipe brace, comprising:

a U-bolt having a bight between a pair of legs;

a clamp bracket, having a pair of wings, a pair of extension plates, attached to the wings, and a base attached between the extension plates;

a pair of nuts for securing the U-bolt to the wings of the clamp bracket;

a support plate;

a nut and a bolt for bolting the base to the support plate;

a pair of screws for connecting the support plate to a support surface.

14. An adjustable pipe brace as recited in claim 13, wherein the support plate has a pair of wings, a pair of extension plates, attached to the wings, and a base attached between the extension plates.

15. An adjustable pipe brace as recited in claim 14, wherein the wings of the support plate are parallel to the base of the support plate and the extension plates extend between the wings and the base at an acute angle.

16. An adjustable pipe brace as recited in claim 15, wherein the angle between the wings of the support plate and the base of the support plate is 45 degrees.

17. An adjustable pipe brace as recited in claim 16, wherein the nut and bolt that bolt the clamp bracket to the support plate can be loosened and retightened to allow the clamp bracket to be pivoted relative to the support plate.

18. An adjustable pipe brace as recited in claim 17, wherein the bolt that bolts the clamp bracket to the support plate has a longitudinal axis, and the clamp bracket pivots about the longitudinal axis of the bolt.

19. An adjustable pipe brace as recited in claim 18, wherein the nuts for securing the U-bolt to the wings can be adjusted to hold pipe of various diameters.

* * * * *